(12) United States Patent
Hsu et al.

(10) Patent No.: US 8,169,147 B2
(45) Date of Patent: May 1, 2012

(54) CIRCUIT FOR VEHICLE LIGHTING

(75) Inventors: Cheng-Wei Hsu, Taipei (TW); Da Liu, Milpitas, CA (US); ShengTai Lee, Taipei (TW); Yung Lin Lin, Palo Alto, CA (US)

(73) Assignee: O2Micro, Inc., Santa Clara, CA (US)

( * ) Notice: Subject to any disclaimer, the term of this patent is extended or adjusted under 35 U.S.C. 154(b) by 436 days.

(21) Appl. No.: 12/561,483

(22) Filed: Sep. 17, 2009

(65) Prior Publication Data

US 2011/0062869 A1    Mar. 17, 2011

(51) Int. Cl.
*B60Q 1/00* (2006.01)
*G01R 31/00* (2006.01)

(52) U.S. Cl. .............................. 315/77; 315/82; 324/414

(58) Field of Classification Search .................... 315/77, 315/82, 291, 294, 297, 301, 307, 313
See application file for complete search history.

(56) References Cited

U.S. PATENT DOCUMENTS

| 6,150,802 | A  | * | 11/2000 | Andrews ........................ 323/282 |
| 7,656,103 | B2 | * | 2/2010  | Shteynberg et al. .......... 315/312 |
| 2008/0150439 | A1 | | 6/2008 | Bucur |
| 2009/0066161 | A1 | | 3/2009 | Lu et al. |
| 2009/0289559 | A1 | * | 11/2009 | Tanaka et al. ............. 315/185 R |
| 2010/0148691 | A1 | | 6/2010 | Kuo et al. |

FOREIGN PATENT DOCUMENTS

CN    101553063 A    10/2009
CN    101754530 A    6/2010

* cited by examiner

*Primary Examiner* — Daniel D Chang

(57) ABSTRACT

A circuit for driving a vehicle lamp includes a current path coupled between a power line and ground, and a monitoring unit coupled to the power line. The current path includes a dummy load. The monitoring unit can monitor a testing signal applied to the power line. The testing signal can test whether the vehicle lamp operates properly. The monitoring unit can conduct the current path to enable a current to flow through the dummy load to ground to decrease a total resistance of the circuit if the testing signal is detected.

21 Claims, 6 Drawing Sheets

CIRCUIT FOR VEHICLE LIGHTING

BACKGROUND

In recent years, light sources such as light emitting diodes (LEDs) have been improved through technological advances in material and manufacturing processes. The LEDs possess characteristics such as a relatively high efficiency, a relatively long life, and vivid colors, and can be used in a variety of industries. One example is to use the LEDs to replace traditional incandescent bulbs in a vehicle lamp. Compared with traditional incandescent bulbs, the LEDs are lighter, compact, long-life, and energy-saving. Moreover, the response time of the LEDs is faster than that of the incandescent bulbs.

For some vehicles that are originally designed to be equipped with incandescent bulbs, there will be a problem if the incandescent bulbs are directly replaced by LEDs. FIG. 1 illustrates a conventional circuit 100 for using an incandescent bulb 102 in a vehicle. The incandescent bulb 102 is powered by a power source 108, e.g., a battery, via a power line 104. Under certain circumstances, a vehicle may need to perform a self-testing to examine whether the incandescent bulb 102 is turned on properly. A micro controlling unit (MCU) in the vehicle (not shown in FIG. 1) may generate a testing signal (usually a square wave signal) and apply the testing signal to the power line 104. A detecting circuit 106 monitors the voltage drop across the incandescent bulb 102. If a waveform of the testing signal has an amplitude greater than a predetermined level, the waveform can be detected by the detecting circuit 106. If the incandescent bulb 102 operates properly, the voltage drop across the incandescent bulb 102 is relatively small because the resistance of the filament in the incandescent bulb 102 is relatively small. Therefore, the waveform of the testing signal is not detected by the detecting circuit 106. If the incandescent bulb 102 is broken down (open circuit condition), the waveform of the testing signal can be detected by the detecting circuit 106 across the incandescent bulb 102. If the testing signal is detected by the detecting circuit 106, the detecting circuit 106 can determine that the incandescent bulb 102 is broken and remind the driver by turning on an indicator light on the dashboard.

FIG. 2 illustrates a conventional circuit 200 using LEDs to replace a traditional incandescent bulb in a vehicle. As shown in FIG. 2, an LED string 202 takes place of the incandescent bulb. The LED string 202 includes multiple LEDs connected in series. Generally, the resistance of the LED string 202 is greater than the resistance of an incandescent bulb. Therefore, when the micro controlling unit (not shown in FIG. 2) applies the testing signal on the power line 104, a waveform of the testing signal may be detected by the detecting circuit 106 across the LED string 202, even if the LED string 202 operates properly. The micro controlling unit may render an erred judgment. To prevent a false alarm, a dummy load, e.g., a resistor 204, is coupled to the LED string 202 in parallel. The resistor 204 can have a relatively small resistance such that the total resistance of the parallel-connected dummy load 204 and the LED string 202 is even smaller. By properly choosing the resistance of the resistor 204, the testing signal is not detected by the detecting circuit 106 across the LED string 202 such that the false alarm can be avoided. A drawback of this solution is that the resistor 204 will constantly consume power and generate heat if the vehicle lamp is turned on.

SUMMARY

A circuit for driving a vehicle lamp includes a current path coupled between a power line and ground, and a monitoring unit coupled to the power line. The current path includes a dummy load. The monitoring unit can monitor a testing signal applied to the power line. The testing signal can test whether the vehicle lamp operates properly. The monitoring unit can conduct the current path to enable a current to flow through the dummy load to ground to decrease a total resistance of the circuit if the testing signal is detected.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
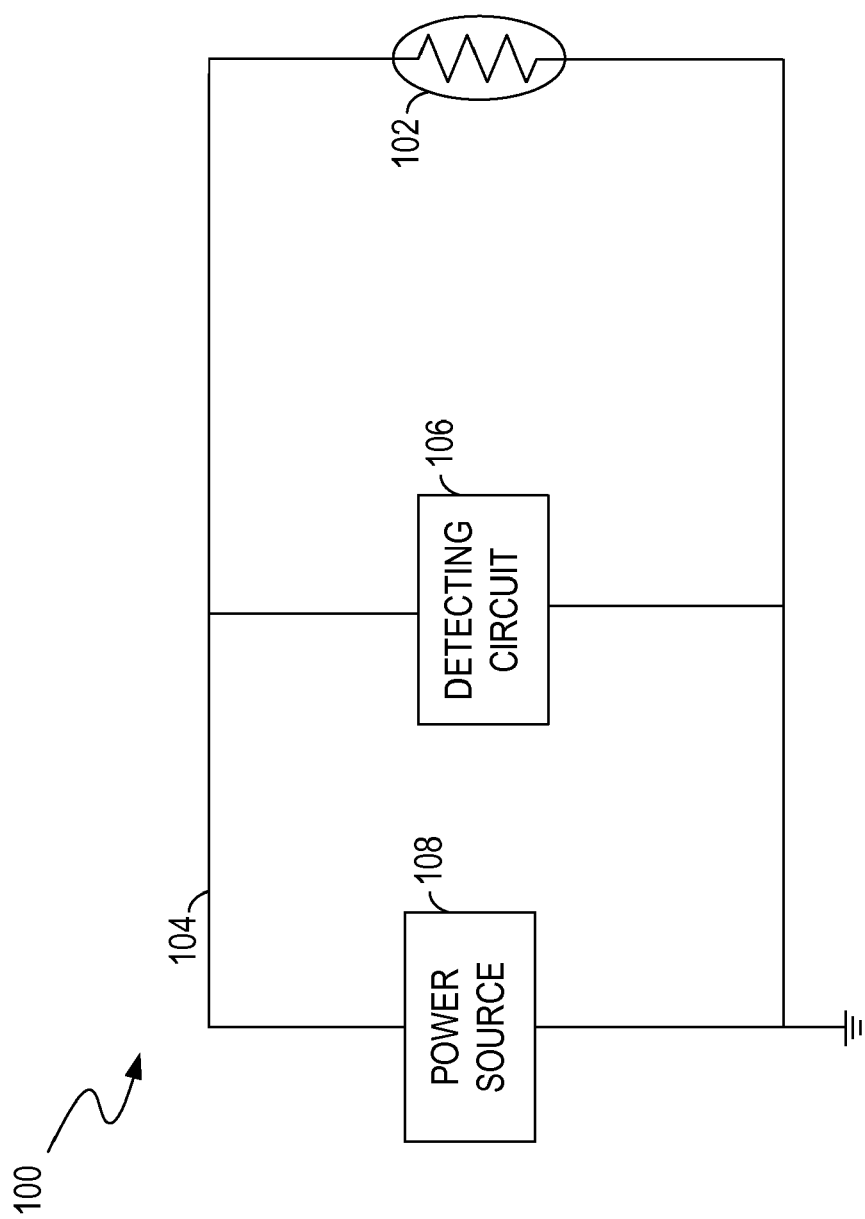
FIG. 1 shows a conventional circuit for using an incandescent bulb in a vehicle.
Figure 2:
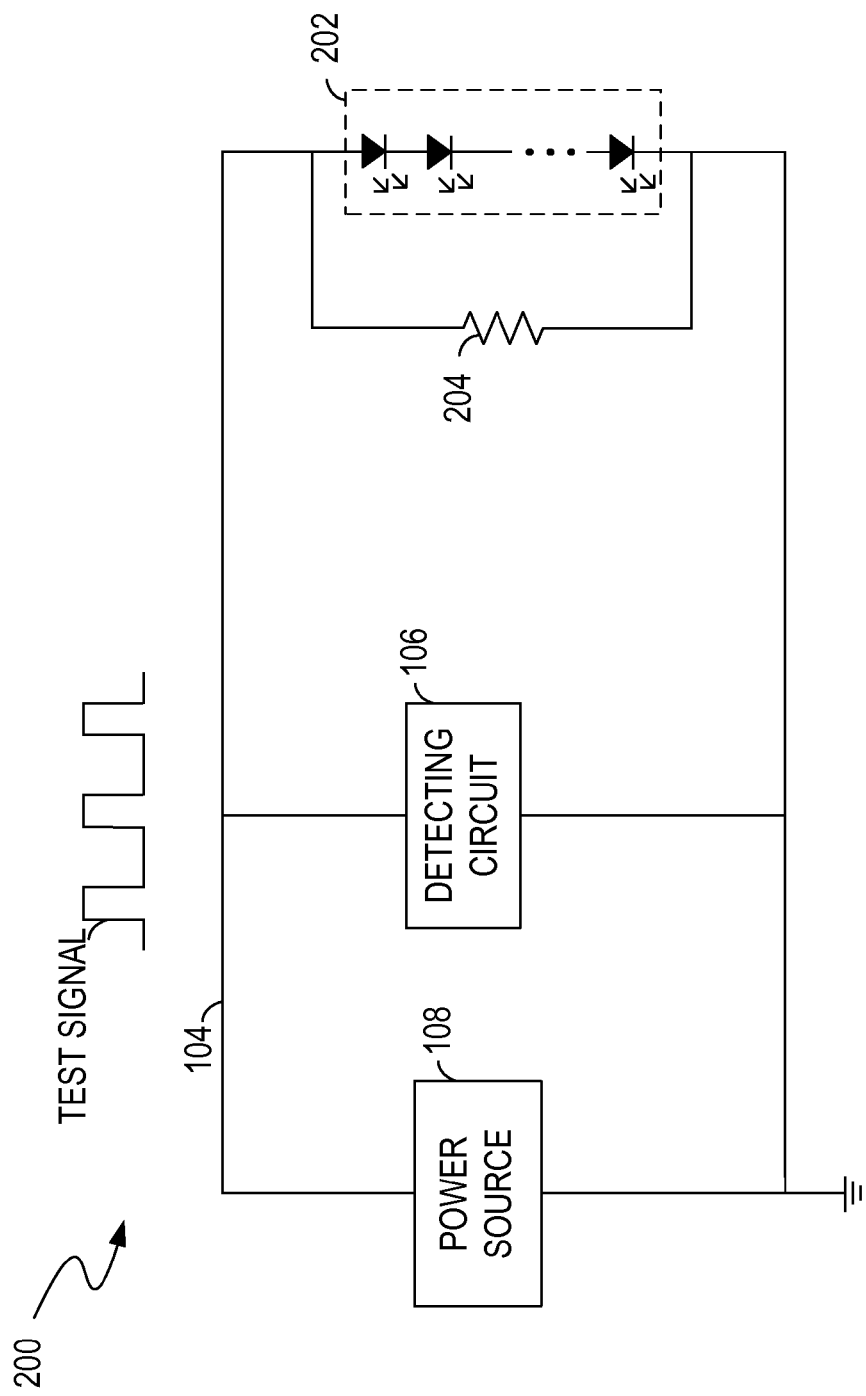
FIG. 2 shows a conventional circuit for using LEDs to replace an incandescent bulb in a vehicle.
Figure 3:
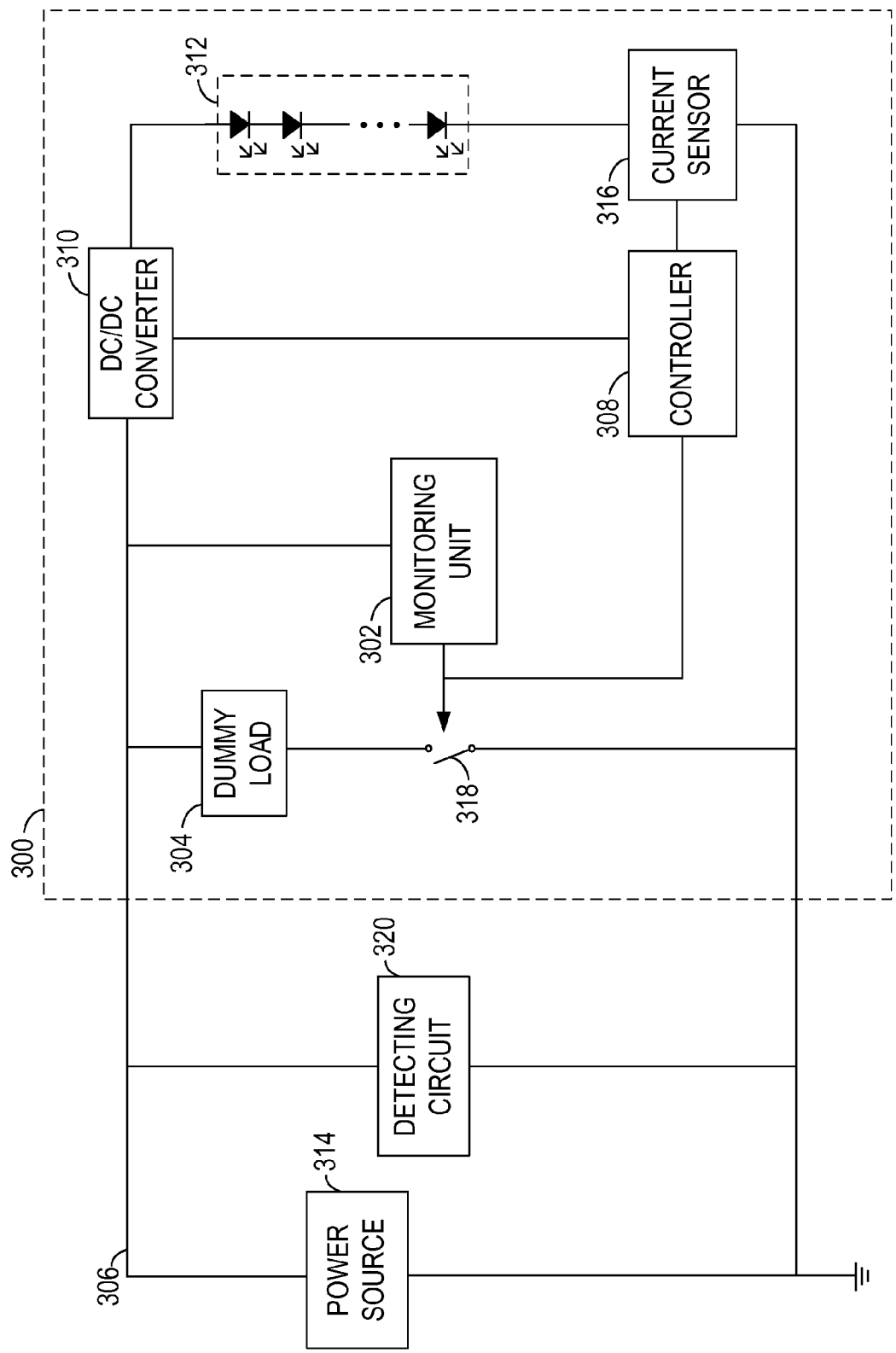
FIG. 3 shows a circuit using LEDs to replace an incandescent bulb in a vehicle, in accordance with one embodiment of the present invention.

FIG. 3 shows a block diagram of a circuit 300 using LEDs to replace an incandescent bulb in a vehicle, in accordance with one embodiment of the present invention. In one embodiment, the circuit 300 is integrated in a vehicle light assembly. The circuit 300 is coupled to a power source 314 through a power line 306. In one embodiment, the power source 314 can be a battery in a vehicle.

The circuit 300 includes a current path coupled between the power line 306 and ground. In one embodiment, the current path includes a dummy load 304 and a switch 318 coupled in series. A monitoring unit 302 is coupled to the power line 306 and can monitor a testing signal on the power line 306. The monitoring unit 302 can control an on/off status of the switch 318 to selectively conduct the current path. If the monitoring unit 302 detects the testing signal on the power line 306, the monitoring unit 302 can switch on the switch 318 to enable a current flowing through the dummy load 304 to ground. As a result, the total resistance of the circuit 300 is decreased. The circuit 300 can further include a DC/DC converter 310 coupled to the power line 306 for providing regulated power to a light source, e.g., an LED string 312. A current sensor 316 can monitor a current flowing through the LED string 312, and can send a sensing signal indicative of the current flowing through the LED string 312 to a controller 308. The controller 308 is coupled to the DC/DC controller 310 and the current sensor 316, and can control the DC/DC converter 310 based on the sensing signal provided by the current sensor 316. Thus, the DC/DC converter 310 can provide regulated power to the LED string 312. The controller 308 is also coupled to the switch 318, and can also determine a conductance status of the current path by controlling the switch 318 based on the current flowing through the LED string 312.

Advantageously, when the vehicle performs a self-testing to examine whether an incandescent bulb in the light assembly can be properly turned on, the circuit 300 can prevent a false alarm if the LED string 312 operates properly. When the vehicle performs a self-testing, a testing signal is applied to the power line 306 for a certain time period, for example, 5 seconds. In one embodiment, the testing signal can be a square wave signal. A detecting circuit 320 can detect a voltage drop across the circuit 300. If the waveform of the testing signal is detected across the circuit 300, the detecting circuit 320 can determine that the light source fails to be turned on and can generate an alarm signal to turning on an indicator light on the dashboard. If the waveform of the testing signal is not detected across the circuit 300, the detecting circuit 320 may determine that the light source operates properly, e.g., is turned on successfully.

Figure 4:
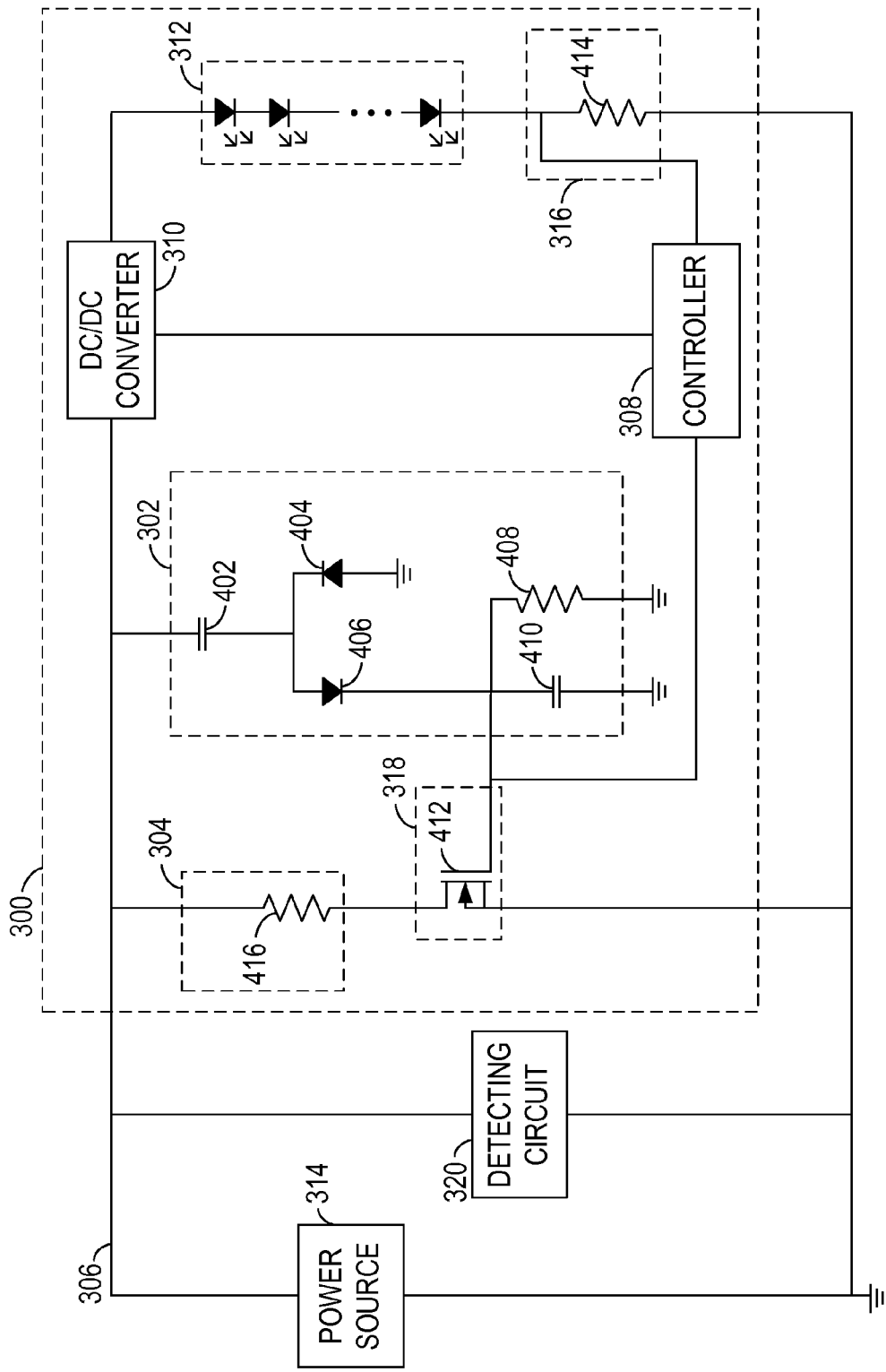
FIG. 4 shows a circuit using LEDs to replace an incandescent bulb in a vehicle, in accordance with one embodiment of the present invention.

In operation, the monitoring unit 302 can detect the testing signal and can turn on the switch 318 to conduct the current path in response to the testing signal. A detailed structure of the monitoring unit 302 according to one embodiment of present invention is illustrated in FIG. 4. When the testing signal is detected, a current is enabled to flow through the dummy load 304 to ground. In other words, the dummy load 304 is parallelly coupled to the circuit 300 when the switch 318 is turned on. As a result, the total resistance of the circuit 300 is decreased. By choosing a dummy load 304 with a proper resistance, the total resistance of the circuit 300 can be reduced. Accordingly, the amplitude of the waveform of the testing signal can be small enough that the detecting circuit 320 does not detect the waveform of the testing signal across the circuit 300. Thus, a false alarm can be avoided. When the self-testing is completed (the testing signal is absent from the power line 306), the monitoring unit 302 can turn off the switch 318 to cut off the current path, so that the dummy load 304 no longer consumes power.

In addition, the controller 308 can detect if there is an abnormal or undesired condition of the LED string 312 according to the current flowing through the LED string 312. For example, if the LED string 312 is in an open circuit condition, the current flowing through the LED string 312 can be substantially zero which is less than a first predetermined current level. If the LED string 312 is in a short circuit condition, the current flowing through the LED string 312 can be greater than a second predetermined current level. Therefore, abnormal/undesired conditions of the LED string 312 such as open circuit and short circuit conditions can be detected by the controller 308 by comparing the current flowing through the LED string 312 with one or more predetermined current references. In one embodiment, the controller 308 can turn off the switch 318 to cut off the current path if an abnormal/undesired condition is detected. As a result, the detecting circuit 320 is able to detect the waveform of the testing signal and generate an alarm signal. Moreover, the controller 308 can control the DC/DC converter 310 based on the current flowing through the LED string 312 such that the DC/DC converter 310 can provide regulated power to the LED string 312. Thus, the LED string 312 can have a desired brightness.

FIG. 4 shows the circuit 300 using LEDs to replace an incandescent bulb in a vehicle. A detailed structure of the monitoring unit 302 in FIG. 3 in accordance with one embodiment of the present invention is illustrated in FIG. 4. Elements labeled the same as in FIG. 3 have similar functions.

Figure 5:
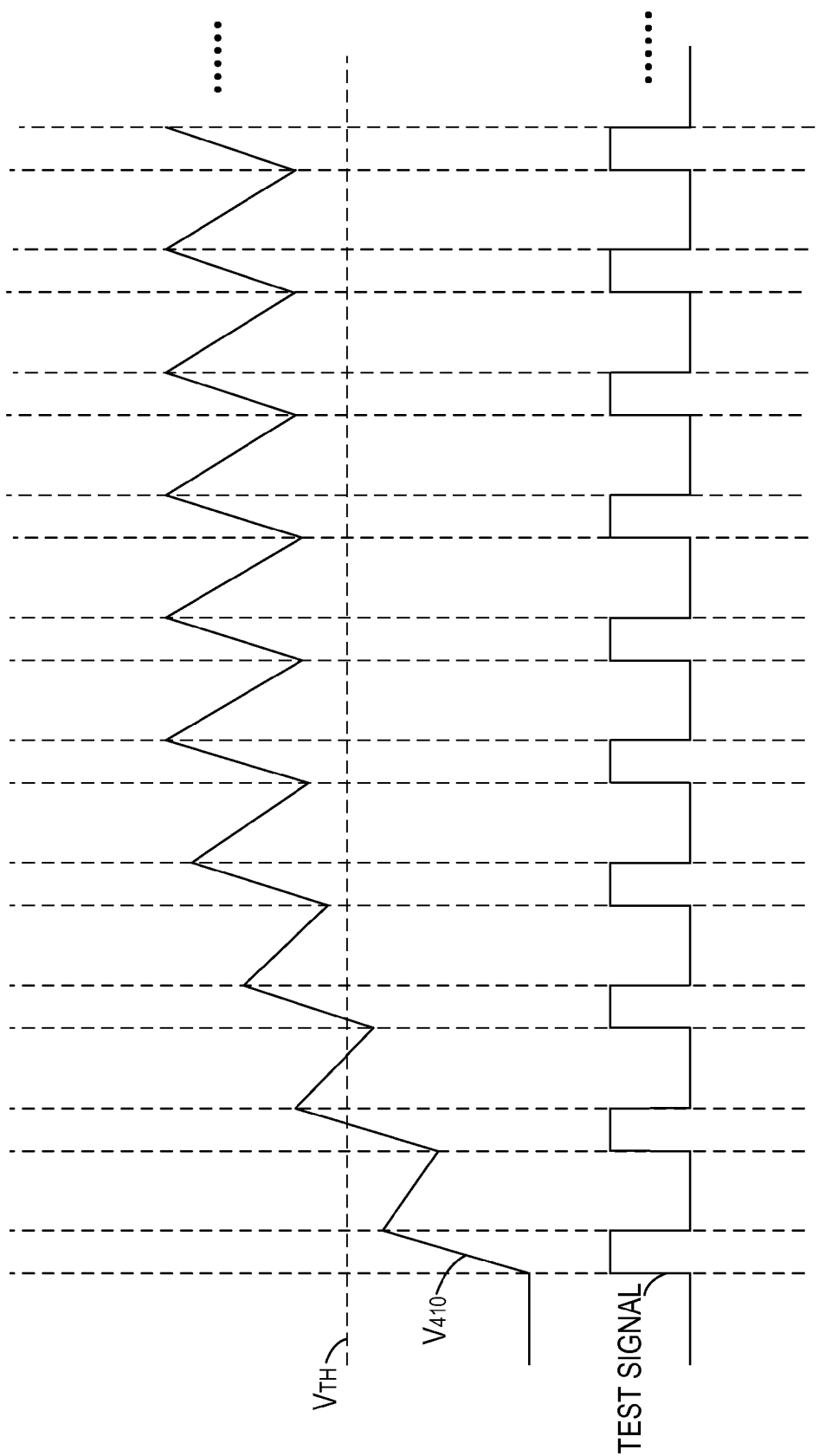
FIG. 5 illustrates a relationship between a voltage across the capacitor 410 in FIG. 4 and the testing signal applied on the power line, in accordance with one embodiment of the present invention.

In the example of FIG. 4, the dummy load 304 includes a resistor 416, the switch 318 includes a transistor 412, and the current sensor 316 includes a resistor 414. In one embodiment, the monitoring unit 302 can include a first capacitor 402 coupled to the power line 306, a first diode 404 with a cathode coupled to the first capacitor 402 and an anode coupled to ground, a second diode 406 with an anode coupled to the first capacitor 402 and a cathode coupled to ground through a second capacitor 410, and a resistor 408 coupled in parallel with the second capacitor 410. A gate terminal of the transistor 412 is coupled to the second capacitor 410 such that an on/off status of the transistor 412 can be determined by a voltage across the second capacitor 410. In one embodiment, the transistor 412 has a threshold voltage Vth. If the voltage V410 across the second capacitor 410 is less than Vth, the transistor 412 is turned off. If the voltage V410 across the second capacitor 410 is greater than Vth, the transistor 412 is turned on. FIG. 5 illustrates a relationship between the voltage V410 across the capacitor 410 and the testing signal applied on the power line 306, in accordance with one embodiment of the present invention. FIG. 4 is described in combination with FIG. 5.

In operation, if the vehicle does not perform a self-testing, there is no testing signal applied on the power line 306. The power line 306 can provide DC power, e.g., a 12V DC voltage, to the circuit 300. The DC power is isolated by the first capacitor 402 such that the second capacitor 410 is not charged. The voltage V410 across the second capacitor 410 is less than the threshold Vth. As a result, the transistor 412 is turned off and the current path is cut off.

In operation, if the vehicle performs a self-testing, a testing signal (shown in FIG. 5) is applied on the power line 306. Since the testing signal has an AC (alternating current) component, the testing signal can pass through the first capacitor 402 and the second diode 406 to charge the second capacitor 410. As can be seen in FIG. 5, when the testing signal is high, the second capacitor 410 is charged such that V410 increases. When the testing signal is low, the capacitor 410 is discharged through the resistor 408 such that V410 decreases.

There can be several ways to choose the proper capacitance of the first capacitor 402, the capacitance of the second capacitor 410, and the resistance of the resistor 408. In one embodiment, the capacitance of the first capacitor 402, the capacitance of the second capacitor 410, and the resistance of the resistor 408 can be properly chosen such that the voltage V410 across the second capacitor 410 reaches a dynamic balance state after a number of consecutive pulses of the testing signal are applied to the power line 306. In one embodiment, the dynamic balance state is obtained when the average value of V410 becomes substantially constant. In one embodiment, the greater the capacitance of the second capacitor 410 and the resistance of the resistor 408, the slower the discharge process of the second capacitor 410 will be. For a testing signal having a lower frequency, the second capacitor 410 has a slower discharge process such that the voltage V410 across the second capacitor 410 can reach the dynamic balance state after a number of consecutive pulses of the testing signal are applied to the power line 306.

In another embodiment, the capacitance of the first capacitor 402 and the capacitance of the second capacitor 410 can be properly chosen such that V410 is less than the threshold voltage of the transistor 412 when there is no testing signal asserted to the power line 306. Thus, the transistor 412 is turned off. Assuming that the DC voltage provided by the power line 306 is $V_{DD}$, the capacitance of the first capacitor 402 is $C_{402}$, the capacitance of the second capacitor 410 is $C_{410}$, the voltage across the second diode 406 is $V_{D2}$, the threshold voltage of the transistor 412 is Vth, $C_{402}$ and $C_{410}$ can be determined according to formula (1) and formula (2).

$$V_{410} = \frac{(V_{DD} - V_{D2}) * C_{402}}{C_{402} + C_{410}} \quad (1)$$

$$V_{410} < Vth \quad (2)$$

Figure 6:
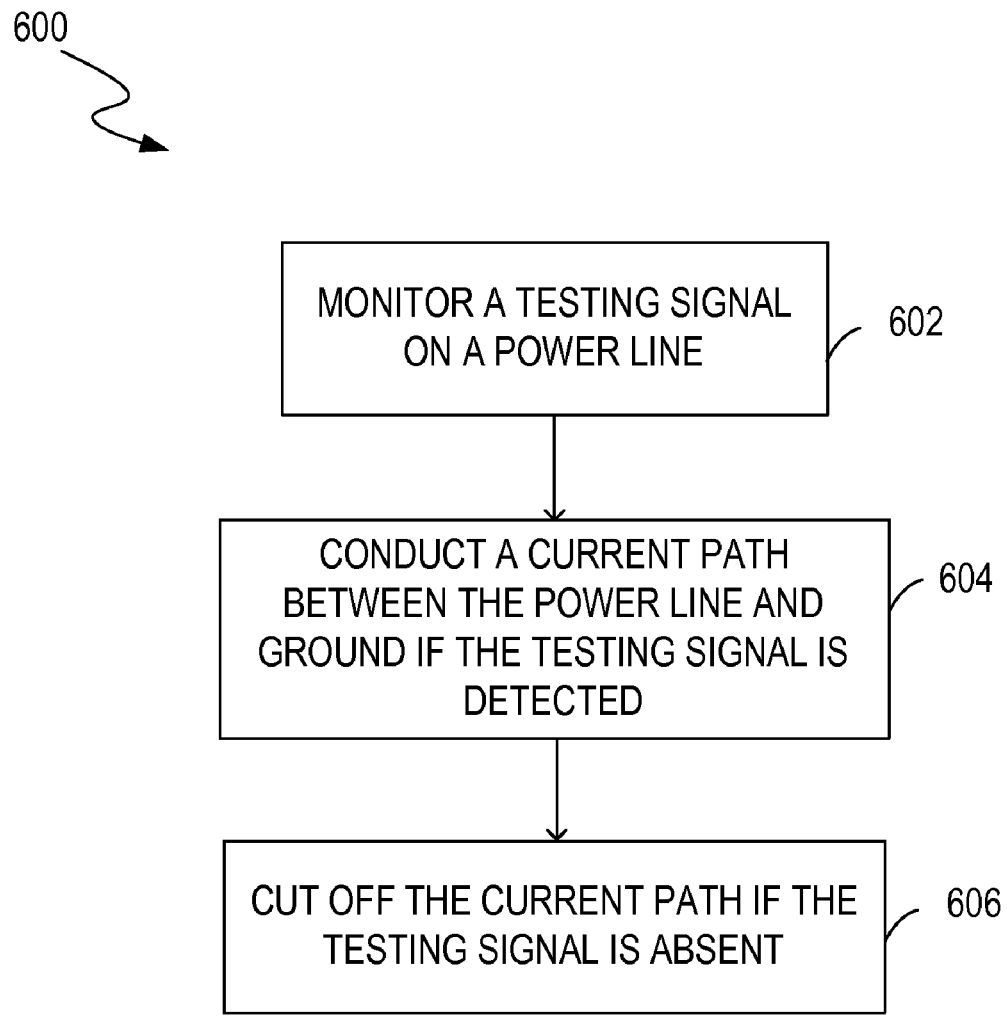
FIG. 6 shows a flowchart of a method for powering a light source in a vehicle, in accordance with one embodiment of the present invention.

FIG. 6 shows a flowchart 600 of a method for powering a light source in a vehicle, in accordance with one embodiment of the present invention. FIG. 6 is described in combination with FIG. 3 and FIG. 4.

In block 602, a testing signal on a power line 306 is monitored, for example, by a monitoring unit 302 in a circuit 300.

In block 604, a current path is conducted to enable a current flowing though a dummy load 304 to decrease a total resistance of the circuit 300. In one embodiment, a capacitor 410 is charged by the testing signal. A voltage across the capacitor 410 is greater than a threshold of a switch 318 such that the switch 318 can be turned on to conduct the current path. As a result, the dummy load 304 is parallelly coupled to the circuit 300 and therefore the total resistance of the circuit 300 can be decreased. Accordingly, the waveform of the testing signal is not detected across the circuit 300 by a detecting circuit 320. Thus, a false alarm can be avoided.

In block 606, if the testing signal is absent from the power line 306, the current path is cut off. In one embodiment, when the testing signal is absent, the voltage across the capacitor 410 is less than the threshold of the switch 318. Thus, the switch 318 can be turned off, and the current path is cut off. Therefore, the dummy load 304 no longer consumes power.

Accordingly, embodiments in accordance with the present invention provide a circuit for driving a vehicle lamp. The circuit can use an LED string as a light source to replace an incandescent bulb in the vehicle lamp. Advantageously, when the vehicle performs a self-testing to examine if the vehicle lamp operates properly, the circuit can conduct a current path to prevent a false alarm from being triggered. Furthermore, by cutting off the current path when the vehicle does not perform a self-testing, the power can be saved and heat dissipation can be reduced.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description

What is claimed is:

1. A circuit for driving a vehicle lamp, comprising:
   a current path coupled between a power line and ground and comprising a dummy load; and
   a monitoring unit coupled to said power line and operable for monitoring a testing signal applied to said power line, wherein said testing signal is operable for testing whether said vehicle lamp operates properly, and wherein said monitoring unit is operable for conducting said current path to enable a current to flow through said dummy load to ground to decrease a total resistance of said circuit if said testing signal is detected.

2. The circuit of claim 1, further comprising:
   a DC/DC converter coupled to said power line and operable for providing regulated power to said vehicle lamp;
   a current sensor coupled to said vehicle lamp and operable for providing a sensing signal indicative of a current flowing through said vehicle lamp; and
   a controller coupled to said current sensor and operable for controlling said DC/DC converter based on said sensing signal, and operable for determining a conductance status of said current path based on said sensing signal.

3. The circuit of claim 2, wherein said controller is operable for cutting off said current path if said vehicle lamp is in an open circuit condition.

4. The circuit of claim 2, wherein said controller is operable for cutting off said current path if said vehicle lamp is in a short circuit condition.

5. The circuit of claim 1, wherein said dummy load comprises a resistor.

6. The circuit of claim 1, wherein said monitoring unit comprises a capacitor, wherein a voltage across said capacitor increases above a threshold if said testing signal is applied to said power line, and wherein said capacitor turns on a switch in said current path if said voltage across said capacitor is above said threshold.

7. The circuit of claim 6, wherein said voltage across said capacitor is below said threshold if said testing signal is absent from said power line, and wherein said switch is turned off if said voltage across said capacitor is below said threshold.

8. The circuit of claim 1, wherein said monitoring unit comprises a first capacitor coupled to said power line and for passing through said test signal and for isolating DC power on said power line.

9. The circuit of claim 8, wherein said monitoring unit further comprises:
   a first diode with a cathode coupled to said first capacitor and an anode coupled to ground; and
   a second diode with an anode coupled to said first capacitor and a cathode coupled to ground through a second capacitor,
   wherein said current path comprises a switch, and wherein a conductance status of said switch is determined by a voltage across said second capacitor.

10. A light assembly, comprising:
    a light source; and
    a circuit coupled to a power line for driving said light source, comprising:
       a first capacitor coupled to said power line, wherein a voltage across said first capacitor increases above a threshold if a testing signal for testing whether said light source operates properly is applied to said power line;

a current path coupled between said power line and ground, wherein said current path is conducted to decrease a total resistance of said circuit if said voltage across said first capacitor is above said threshold.

11. The light assembly of claim 10, further comprising:
a DC/DC converter coupled to said power line and operable for providing regulated power to said light source;
a current sensor coupled to said light source and operable for providing a sensing signal indicative of a current flowing through said light source; and
a controller coupled to said current sensor and operable for controlling said DC/DC converter based on said sensing signal, and operable for determining a conductance status of said current path based on said sensing signal.

12. The light assembly of claim 11, wherein said controller is operable for cutting off said current path if said light source is in an open circuit condition.

13. The light assembly of claim 11, wherein said controller is operable for cutting off said current path if said light source is in a short circuit condition.

14. The light assembly of claim 10, wherein said current path comprises a resistor.

15. The light assembly of claim 10, wherein said light source comprises a light emitting diode (LED) string.

16. The light assembly of claim 10, wherein said circuit comprises:
a second capacitor coupled to said power line;
a first diode with a cathode coupled to said second capacitor and an anode coupled to ground; and
a second diode with an anode coupled to said second capacitor and a cathode coupled to ground through said first capacitor;
wherein said current path comprises a switch, and wherein a conductance status of said switch is determined by a voltage across said first capacitor.

17. A method for driving a vehicle lamp by a circuit, comprising:
monitoring a testing signal on a power line, wherein said testing signal tests whether said vehicle lamp operates properly;
conducting a current path between said power line and ground to decrease a total resistance of said circuit if said testing signal is detected; and
cutting off said current path if said testing signal is absent.

18. The method of claim 17, further comprising:
monitoring a current flowing through said vehicle lamp; and
cutting off said current path if said vehicle lamp is in an open circuit condition.

19. The method of claim 17, further comprising:
monitoring a current flowing through said vehicle lamp; and
cutting off said current path if said vehicle lamp is in a short circuit condition.

20. The method of claim 17, further comprising:
converting input power from said power line to regulated power by a DC/DC converter;
controlling said DC/DC converter based on a current flowing through said vehicle lamp; and
powering said vehicle lamp by said regulated power.

21. The method of claim 17, further comprising:
charging a capacitor by said testing signal; and
turning on a switch in said current path to conduct said current path if a voltage across said capacitor is greater than a threshold.

* * * * *